(12) United States Patent
Gary et al.

(10) Patent No.: US 6,662,253 B1
(45) Date of Patent: Dec. 9, 2003

(54) SHARED PERIPHERAL ARCHITECTURE

(75) Inventors: Sonya Gary, Longmont, CO (US); Karen Tyger, Longmont, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 453 days.

(21) Appl. No.: 09/660,577

(22) Filed: Sep. 13, 2000

(51) Int. Cl.[7] .............................. G06F 13/38; G06F 3/00
(52) U.S. Cl. .................................... 710/244; 710/51
(58) Field of Search .......................... 710/51, 113–125, 710/309, 316, 317, 240–244

(56) References Cited

U.S. PATENT DOCUMENTS

| | | | | | |
|---|---|---|---|---|---|
| 5,317,749 A | * | 5/1994 | Dahlen | ........................ | 710/200 |
| 5,408,671 A | * | 4/1995 | Tanaka | ........................ | 709/214 |
| 5,678,026 A | * | 10/1997 | Vartti et al. | .................. | 711/152 |
| 5,937,428 A | * | 8/1999 | Jantz | ............................ | 711/114 |
| 6,378,017 B1 | * | 4/2002 | Girzon et al. | ............... | 710/306 |
| 6,438,720 B1 | * | 8/2002 | Boutaud et al. | ............ | 714/724 |
| 6,473,821 B1 | * | 10/2002 | Altmayer et al. | ........... | 710/240 |
| 6,499,131 B1 | * | 12/2002 | Savithri et al. | ................ | 716/5 |
| 6,502,167 B1 | * | 12/2002 | Tanaka et al. | .............. | 711/114 |
| 6,505,257 B2 | * | 1/2003 | Murata et al. | ................. | 710/8 |

OTHER PUBLICATIONS

Computer Dictinary, $2^{nd}$ Edition, 1994, Microsoft Press, pp. 125–126.*

* cited by examiner

*Primary Examiner*—Glenn A. Auve
*Assistant Examiner*—Trisha Vu
(74) *Attorney, Agent, or Firm*—Lisa K. Jorgenson; William J. Kubida

(57) ABSTRACT

A disk drive controller including a plurality of processors and a plurality of shared peripheral units. A shared bus couples the peripheral units and the processors. A bi-directional multiplexor selectably couples each of the plurality of processors to the shared bus in response to an owner signal. A set of peripheral-share registers where a first member of the set includes an entry associated with each of the plurality of peripheral units and holds a state value indicating which of the plurality of processors currently owns the associated peripheral unit.

19 Claims, 4 Drawing Sheets

SHARED PERIPHERAL ARCHITECTURE

BACKGROUND OF THE INVENTION

1. Field of the Invention

The present invention relates, in general, to disk multi-processing circuits, and, more particularly, to software, systems and methods enabling multiple processors to flexibly share a group of peripheral circuits. Even more particularly, the present invention relates a multiple processor disk drive controller having a shared peripheral architecture.

2. Relevant Background

Multiprocessor architectures have been widely used for general purpose computing systems where it is desired to provide higher instruction throughput. However, multiprocessors have had limited application in embedded computing systems that are less computing intensive. One issue in embedded systems is the efficient sharing of peripherals between the multiple processors in a non-conflicting manner.

Disk drive controller devices are an example of embedded systems that conventionally use a single processor core accessing multiple peripheral circuits. Disk drive controller circuits are circuits that manage data storage and retrieval on associated storage hardware. The disk controller provides a host interface to one or more host computers and conducts data transactions with the host(s) using an available protocol over this host interface. At a basic level, the controller circuit receives read and write requests over the host interface and then performs the requested operation.

A read request typically identifies a location in the storage device from which data is to be read. A response to a read request includes the data stored at the specified location. A write request includes data that is to be written and specifies a location where it is to be stored. In response to a write request the controller causes the data to be stored at the specified location and typically sends an acknowledgment signal to the device that generated the write request.

In addition to these basic transactions a disk controller may support other functionality and interfaces. For example, a controller may include a serial port, a general purpose input output (GPIO) port, RS-232 serial ports and the like. With respect to functionality, the disk drive controller may implement timers, interrupt controllers, diagnostic circuitry, and the like.

Preferably, disk drive controllers are implemented as single integrated circuits having an embedded processor core. The processor core controls one or more peripheral circuits that implemented particular disk drive functionality. The processor core is coupled to the peripherals by a shared peripheral bus. In systems with but a single processor core, there was never a problem with peripheral access as the single processor had complete control over the bus and each peripheral.

The processor executes previously stored program code to implement responses to commands received from host computers. A portion of the code that controls servo functionality (called "servo code") must operate at a high priority to ensure that the servo mechanism(s) that position the read/write head correctly with respect to the media are performed efficiently and accurately during read and write operations. Other code is also provided to handle lower priority functions such as cache management, defect table management, peripheral interaction, and the like.

There is continuing need to improve the servo control mechanisms. As a result, the servo code is becoming more complex and demands an increasing load on the limited processor resources. At the same time, improvements in disk controller functionality and features result in increasing processor demands being placed by the lower priority code and peripheral circuits. Single processor designs use available interrupt mechanisms to give higher priority to servo code execution when lower priority code competes for processor resources. However, this impacts the ability to execute lower priority code efficiently.

These trends indicate a need for disk drive controllers with greater processing power. In particular, a need exists for disk controllers that implement parallel processing with multiple processing units to handle disk access requests, servo control, and peripheral functionality more efficiently. Multiprocessor designs provide improved ability to prioritize servo code execution while maintaining available processor resource for execution of other code.

To provide improved storage functionality and efficiency, dual processor disk drive controllers are being developed. Dual processors enable the controller to handle multiple tasks in parallel. However, to save chip area it is desirable to implement at least some, if not all, peripheral circuitry as shared between the multiple processor cores. However, this creates contention between the multiple processors whenever both wish to access the same shared peripheral at the same time. Hence, a need exists for software, systems and devices for implementing efficient sharing of peripherals in multi-processor disk controller devices.

SUMMARY OF THE INVENTION

Briefly stated, the present invention involves a disk drive controller including a plurality of processors and a plurality of shared peripheral units. A shared bus couples the peripheral units and the processors. A bi-directional multiplexor selectably couples each of the plurality of processors to the shared bus in response to an owner signal. A set of peripheral-share registers where a first member of the set includes an entry associated with each of the plurality of peripheral units and holds a state value indicating which of the plurality of processors currently owns the associated peripheral unit.

DETAILED DESCRIPTION OF THE PREFERRED EMBODIMENTS

The present invention is illustrated and described in terms of a hard disk controller but it will be appreciated that the essential teachings are readily applied to many applications using multiple embedded processors that share one or more peripherals. In particular, many processor-controlled devices must execute operating system code as well as "application code" that perform application specific functions. Such devices will benefit from having a processor core dedicated to executing operating system code while an independent processor executes application code. Further, devices may benefit from having multiple processors executing separate threads or processes within the application code. Accordingly, the specific implementations within a disk drive controller are not construed as limitations on the teachings of the present invention. Although two processors are used in the particular embodiment, any number of processor may be used. Moreover, the present invention is readily extended to any number and variety of peripheral units.

Figure 1:
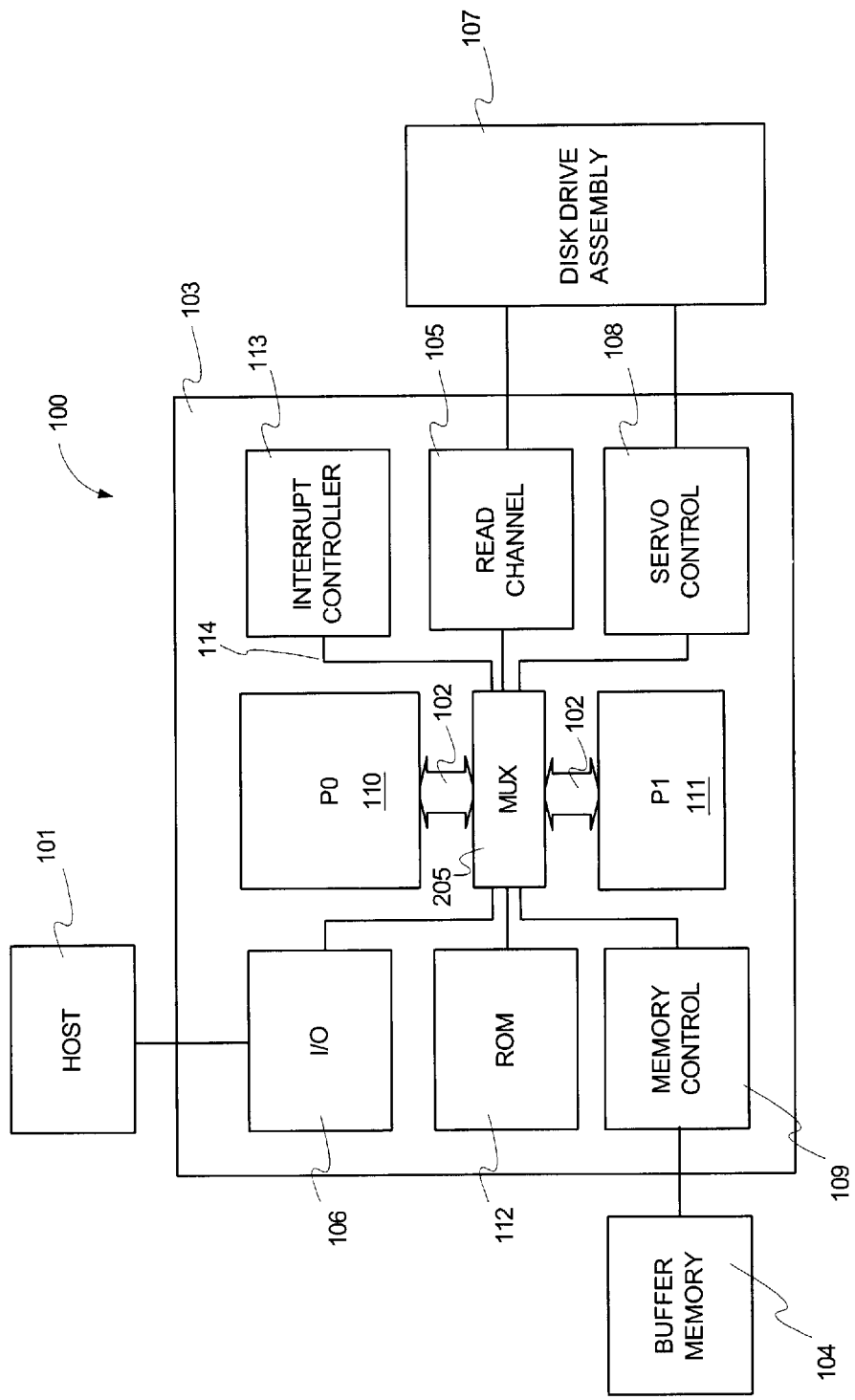
FIG. 1 shows a disk drive controller in accordance with the present invention.

FIG. 1 illustrates in simplified form a drive system 100 in which the present invention is embodied. Disk drive system 100 processes requests and commands from a host computer 101 that direct drive system to perform specific behavior involving disk drive assembly 107. Examples include reading and writing data to media, providing state information such as defect tables, error status, and the like. Disk control unit 103 includes data processing capacity as well as memory to generate responses to received commands and requests. The generated responses return data, state information, and/or error codes depending on the particular operation being performed.

Disk drive assembly 107 implements physical mass storage typically on a plurality of magnetic disks and read/write head electronics for transferring data with the disks. Disk drive assembly includes the read channel hardware for preprocessing and amplifying data read from the magnetic media as well as motors for spinning the disks and positioning the read/write head electronics with respect to the disk surfaces.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host to the disk controller includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection, and the like) to memory controller 109.

In accordance with the present invention, disk controller 203 comprises multiple processor cores 110 and 111 labeled P0 and P1 in FIG. 1. Processor cores 110 and 111 comprise embedded digital signal processor (DSP) devices in a particular embodiment, however, the present invention is usefully implemented using a variety of processor technologies including reduced instruction set computers (RISC), complex instruction set computers (CISC), and the like. Although processors 110 and 111 are typically substantially identical, they may be differentiated to optimize performance for particular tasks.

Disk controller 103 includes a variety of peripherals coupled to processors 110 and 111 through a processor bus 102. Processor bus 102 includes an address bus and a data bus for each processor 201. The address/data bus lines from each processor 201 are coupled to a multiplexor 205. Multiplexor 205 couples a selected processor bus 102 to a selected peripheral via a multiplexed processor bus 114 coupled to each peripheral.

Peripherals include read channel unit 105 that interfaces with disk drive assembly 107 to process data coming from the read channel electronics. Servo control unit 108 generates control signals and monitors feedback signals related to spin speed and read/write head positioning. Input/output (I/O) 106 provides one or more serial ports, parallel ports, and the like for accessing disk controller 103 during operation, testing, and maintenance. Read only memory (ROM) 112 stores program code and optimization parameters executed by processors 110 and 111. ROM 112 may be re-writable under control of one or the other of processors 110 and 111 so as to fine tune or change functionality. Interrupt controller 113 handles interrupt events such as when errors are detected or generated by any of the peripheral components, conflicts between devices, and prioritization of running code.

Figure 2:
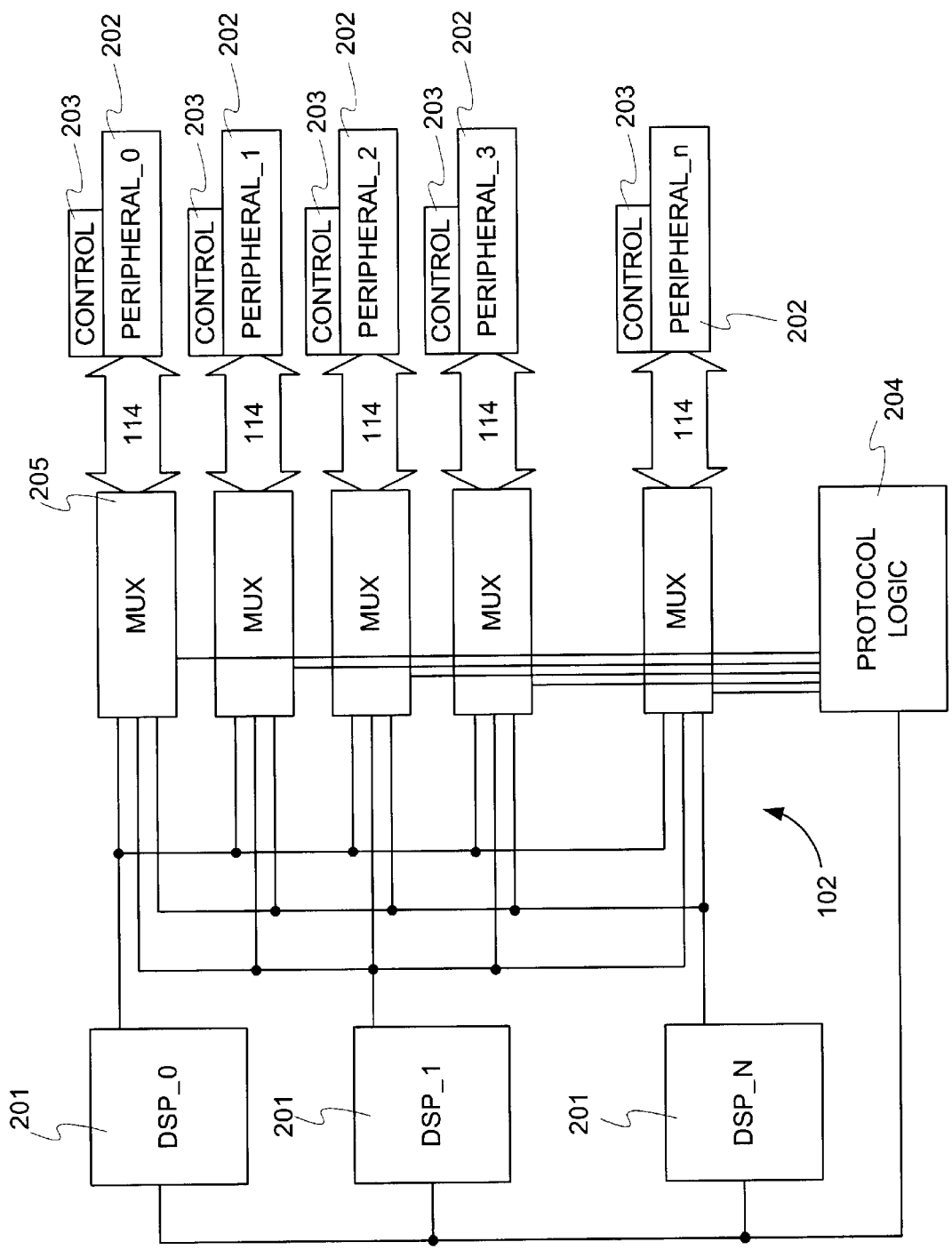
FIG. 2 shows data flow diagram illustrating functionality of a disk drive controller in accordance with the present invention.

Because the peripherals are shared by both processors 110 and 111, it is necessary to provide a means of arbitrating access to each peripheral so that each peripheral is certain at any point in time which processor it is in communication with. FIG. 2 illustrates in block diagram form principal components of the peripheral access mechanisms within disk controller 103 in accordance with the present invention. Bus 102 and multiplexed bus 114 are illustrated as unified, however it should be understood that they comprise both address portions as well as data portions and may include separate control portions as well.

In the exemplary implementation each bus 102 comprises a complete set of address and data lines for each processor 201. Multiplexor(s) 205 operate under control of an OWNER signal provided to each multiplexor 205 by protocol logic 204 to select which of the address and data lines are coupled to the associated peripheral 202. Preferably, each processor bus 102 is multiplexed as close to the processors as possible and the multiplexed output 114 (e.g., a single address/data bus) is routed to each of the peripherals.

Multiplexors 205 enable any processor 201 to access any peripheral while ensuring that each peripheral is only used by a single processor at any given time. Peripherals 202 may be shared statically by assigning ownership to a particular processor 201 at boot time. Alternatively, peripherals 202 may be shared dynamically such that either processor 201 may request access to any peripheral 202 at any time.

Peripherals are controlled by a set of peripheral control registers 203 that reside at each peripheral unit. The peripheral control registers hold peripheral-specific data that relates to state, functionality, addressing, and/or data transferred to the peripheral. Dynamic sharing of peripherals 202 is accomplished by sharing the peripheral control registers 203 that reside at each peripheral unit. The sharing of peripheral control registers 203 is important because duplication of these registers would result a need for duplicate sets of control registers at each peripheral unit 202 and the content of the registers 203 would have to be multiplexed based on peripheral ownership in order to control a peripheral unit 202.

Figure 3:
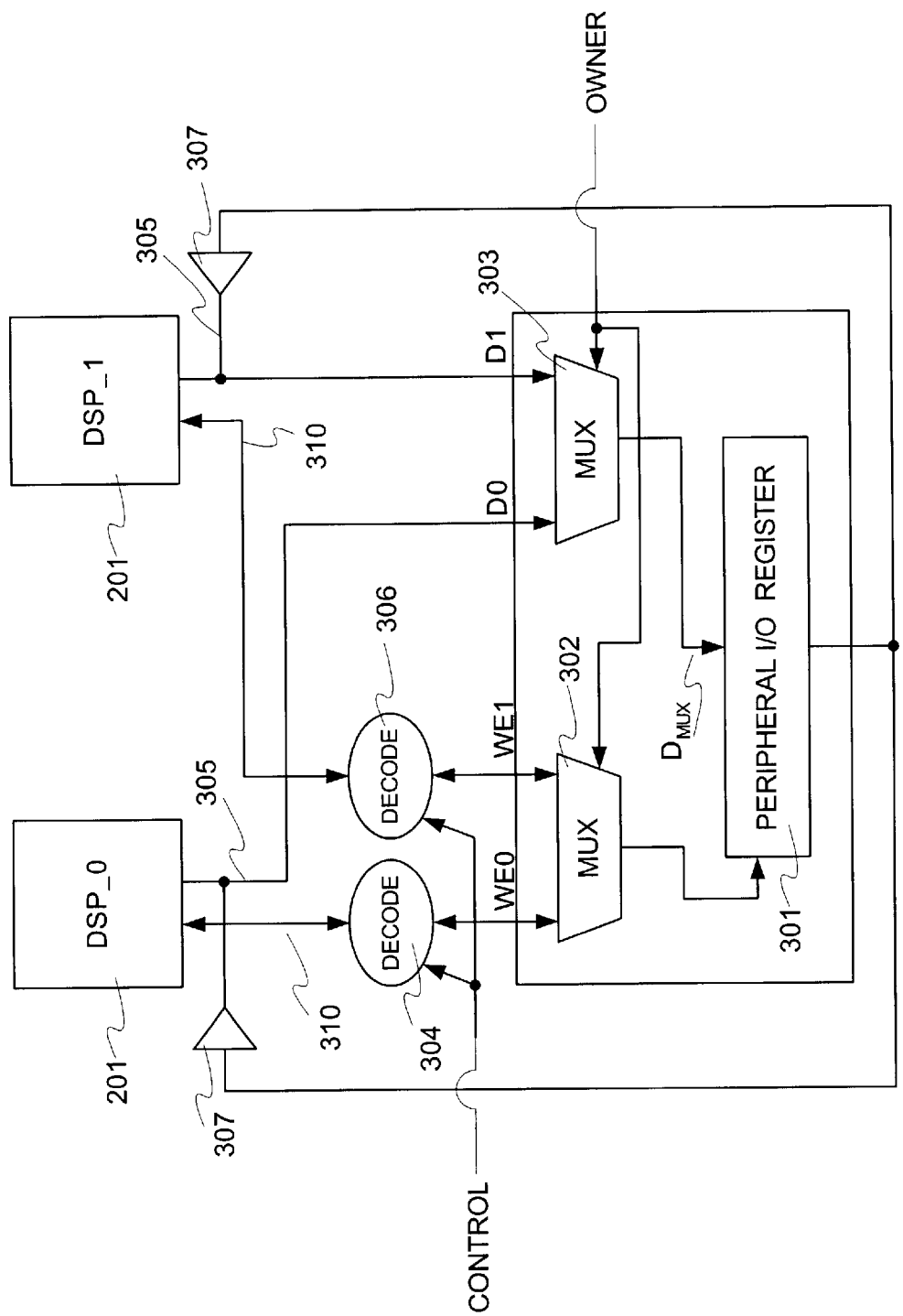
FIG. 3 illustrates in block diagram form.

FIG. 3 shows a data flow of a two processor implementation in accordance with the present invention. Peripheral I/O register 301 is associated with a particular peripheral 202 and holds data entering and leaving an associated peripheral. Hence, a peripheral control register 301 is associated with each peripheral 202 that can be shared in accordance with the present invention. Peripherals 202 are memory mapped devices which means that of the finite address space reachable by the address lines 310, each peripheral 202 is assigned a unique range of addresses for I/O purposes. In the particular example address busses 310 are ten bits wide defining a total address space comprising 1024 addresses. This range is apportioned amongst the peripherals 202 not only to identify the particular peripherals, but also to identify registers or other memory mapped devices within a particular peripheral.

Decode logic 304 decodes the address applied by DSP_0 while decode logic 306 decodes the address applied by DSP_1. Decode logic 304 and 306 receive control signals such as a read/write control signal that indicate whether the current operation is a read or a write. Whenever the decoded address is within the range assigned to the peripheral (as indicated by the particular decode logic), a write enable signal is generated to address multiplexor (MUX) 302. The output of address MUX 302 is selected by an OWNER signal. The OWNER signal indicates which of the available processors (i.e., DSP_0 or DSP_1) currently owns the associated peripheral. Only the decoded address from the owner peripheral is allowed to pass to the clocking or latching input of peripheral control register 301.

The sixteen bit data bus 305 from each of processors 201 is coupled to data MUX 303. Data MUX 303 is also controlled by the OWNER signal to select only one data bus 305 to be passed to the data input of peripheral control register 301. During a write operation, when register 301 receives the write enable signal the data currently supplied from data MUX 302 is latched into register 301. During a read operation a read signal (not shown) is indicated to register 301 by any processor 201 resulting in driving the data bus 305 to the values stored in the peripheral control register 301.

When dynamic peripheral sharing is enabled, each processor 201 has the ability to read and write to a peripheral control register 301. A write operation to control register 301 is serialized via the two MUXes 302 and 303 that are controlled by the OWNER signal. The OWNER signal is a part of the peripheral-share register set shown in FIG. 5. When dynamic sharing is not enabled, peripheral ownership defaults to a preassigned "master" processor (e.g., DSP_0) unless the master processor reassigns peripheral ownership at boot time.

Figure 4:
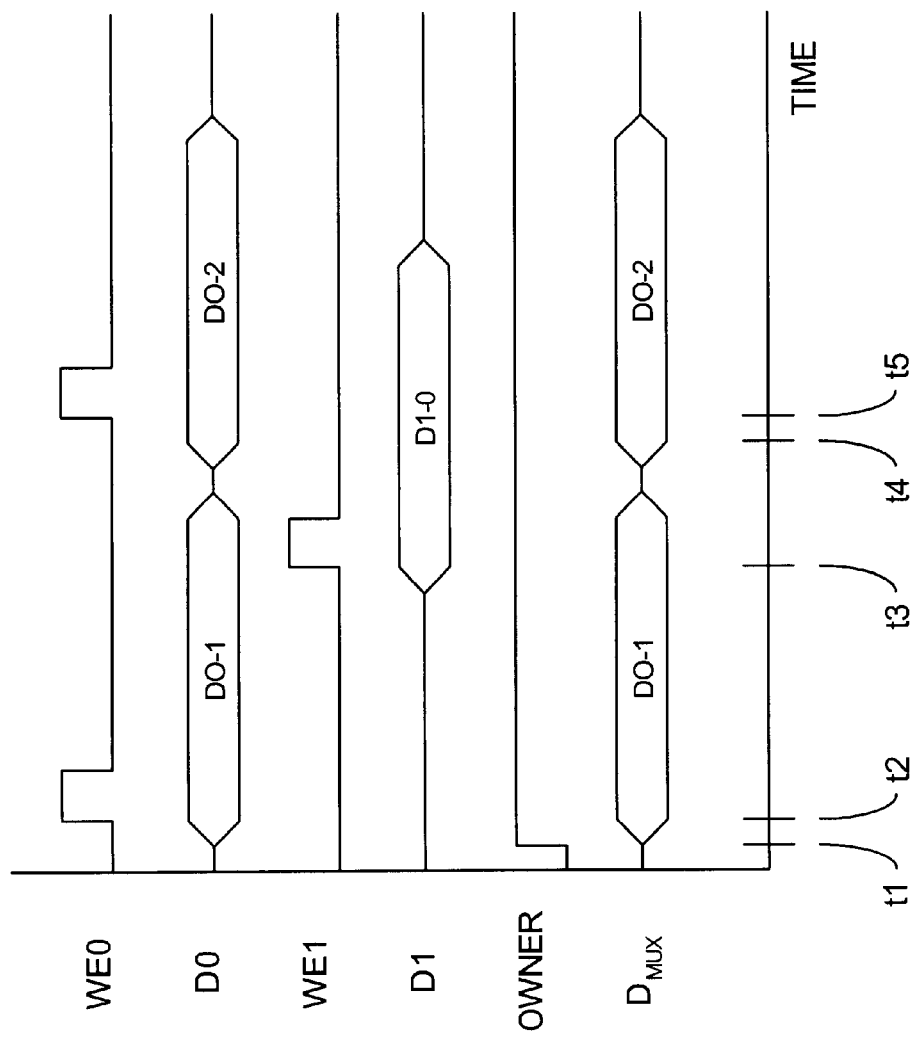
FIG. 4 shows a timing diagram of events illustrating operation of an embodiment of the present invention.

FIG. 4 shows relative timing of events in a write operation to a shared peripheral control register 301 in accordance with the present invention. It will be recalled that data is not transferred into register 301 until the data is present at the $D_{MUX}$ node and the write enable is asserted from the address MUX 302.

In FIG. 4, at time t1 the OWNER signal goes high indicating that DSP_0 owns the peripheral. At time t2, the D0 node having data from DSP_0 becomes valid at which time a write enable WE0 decoded from the address output by DSP0 can be asserted. Because the OWNER signal indicates that DSP_0 is the current assigned owner, MUX 302 couples the WE0 signal to the write enable input of register 301 while blocking the WE1 signal. The transition of the WE0 signal causes the D0–1 data to be coupled to the DMUX output as shown in FIG. 4.

Hence, the transition at time t3 of the WE1 signal has no effect on this peripheral register 301 even though the WE1 signal is generated by an address asserted by DSP_1 that is assigned to the peripheral. At time t3 the data lines D1–0 are driven by DSP_1, but this data is ignored by peripheral control register 301 as indicated by the lack of change in the DMUX output.

At time t4 new data D0–2 is placed on the D0 line and selected by MUX 303 for coupling to the DMUX line because the OWNER signal remains in a state indicating that DSP_0 remains the owner. At time t5 WE0 is reasserted and coupled to peripheral control register 302 to clock the D0–1 data into register 301. In this manner, conflict between multiple processors 201 attempting to write data in simultaneous or overlapping time periods is prevented.

Figure 5:
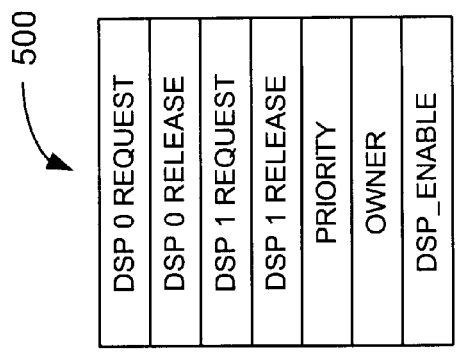
FIG. 5 shows a register layout of peripheral share registers used in an implementation of the present invention.

FIG. 5 illustrates an exemplary peripheral share register set 500 useful in implementing the present invention. A single register set 500 is provided for all peripherals that participates in the peripheral sharing method in accordance with the present invention. Peripheral register set 500 is preferably implemented on the same integrated circuit as processors 201 so that the values stored therein are readily accessible to each processor 201.

In the particular example, there are six peripheral share registers in each set 500 that control ownership and transfer of ownership of peripherals 202. Each of these registers contains a bit dedicated to each peripheral. Multiple bits per processor in each register will be required where more than two processors 201 are permitted to share a peripheral. At boot time, the master processor 201 (e.g., DSP_0) has write access by default to the OWNER register. All peripherals default to ownership by the preassigned master processor. Any processor 201 can be designated a master processor, however, this assignment is not dynamically configurable in the particular examples. For ease of understanding and description all references herein to a master processor will refer to DSP_0.

The master may assign a peripheral 202 to any of the other processors 201 by writing to the bits in the OWNER register corresponding to the selected processor. In applications where dynamic processor sharing is not enabled, this assignment is the only register manipulation necessary. Even where dynamic sharing is not enabled, the present invention adds usefulness because the peripheral-processor assignments can be made by software rather than by hard wired connections. This enables the chip to be manufactured without knowledge of the end use or processor-peripheral assignments required by that end use.

The master processor may enable dynamic sharing by setting the dynamic sharing enable bit identified as DSP_ENABLE in FIG. 5. Once this bit is set, the master processor no longer has write access to the OWNER register and this register will be writable only by the protocol logic 204 (shown in FIG. 2) which implements the dynamic sharing protocol.

When dynamic sharing is enabled, a processor 201 must write to its corresponding REQUEST register. In the example, DSP_0 writes to the REQUEST_0 register while DSP_1 writes to the REQUEST_1 register. In each REQUEST register one or more bits are associated with each peripheral and the corresponding processor requests access by writing to the bits associated with the desired peripheral. If the desire peripheral is owned by another processor, that other processor must release the peripheral by setting the bits associated with the peripheral in its RELEASE_ register. In the example, DSP_0 writes to the RELEASE_0 register while DSP_1 writes to the RELEASE_1 register. Once protocol logic 204 determines that the appropriate REQUEST and the alternate processor's RELEASE register bits are set, protocol logic 204 will grant ownership of the peripheral 202 to the requesting processor by setting/clearing the OWNER register bits associated with that peripheral. Protocol logic 204 will then clear the REQUEST and RELEASE registers.

If needed, the master processor may program the PRIORITY register to determine which processor will "win" the resource when simultaneous requests are raised. In the particular examples, the default is to grant the master processor priority. It is desirable that the processor 201 that fails to write to peripheral control register 301 be able to learn of the failure so that appropriate action can be taken (e.g., rescheduling the write). This is one function of protocol logic 204 shown in FIG. 2.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A disk drive controller comprising:
   a plurality of processors;
   a plurality of peripheral units;
   a bus coupling to each of the peripheral units;
   a bi-directional multiplexor for selectably coupling each of the plurality of processors to the bus in response to an owner signal;
   a set of peripheral-share registers wherein a first member of the set includes an entry associated with each of the plurality of peripheral units that holds a state value indicating which of the plurality of processors currently owns the associated peripheral unit.

2. The controller of claim 1 wherein the multiplexor comprises:
   an address multiplexor coupled to address outputs of each of the plurality of processors wherein the address multiplexor selectively couples one of the processor address outputs to a MUX address output based on the state of the owner signal;
   a data multiplexor coupled to data outputs of each of the plurality of processors, wherein the data multiplexor selectively couples one of the processor data outputs to a MUX data output based on the state of the owner signal; and
   a shared register having an address port coupled to the MUX address output, a data port coupled to the MUX data output, and a bus port coupled to communicate with the bus.

3. The controller of claim 1 wherein the set of peripheral share registers includes a second register holding a value indicating whether the peripheral units are permitted to be dynamically shared amongst the plurality of processors.

4. The controller of claim 1 wherein the set of peripheral share registers includes a plurality of request registers such that each request register corresponds to one of the plurality of processors, wherein each request register has an entry associated with each of the peripheral units, and wherein each entry holds a value indicating whether the corresponding processor is requesting ownership of the associated peripheral unit.

5. The controller of claim 1 wherein the set of peripheral share registers includes a plurality of release registers such that each release register corresponds to one of the plurality of processors, wherein each release resister has an entry associated with each of the peripheral units, and wherein each entry holds a value indicating whether the corresponding processor is releasing ownership of the associated peripheral unit.

6. The controller of claim 1 wherein the set of peripheral share registers includes a priority register having an entry associated with each of the peripheral units, wherein each entry holds a value indicating which of the plurality of processors wins ownership of the associated peripheral unit when a conflict occurs between two or more of the processors requesting ownership of the associated peripheral unit.

7. The controller of clam 1 wherein the state value is set to a static value at boot time.

8. The controller of claim 1 wherein the state value is dynamically configurable during operation by at least one of the plurality of processors.

9. A method for sharing a plurality of peripheral units in a disk drive controller having a plurality of processors comprising:
   generating a plurality of access requests using the plurality of processors;
   storing a state value associated with each peripheral unit, the state value indicating which of the plurality of processors is a current owner of the associated peripheral; and
   selectively coupling each peripheral unit to receive only access requests generated by a particular processor indicated by the state value associated with that peripheral unit.

10. The method of claim 9 further comprising:
   performing the storing at boot time as a static value that cannot be changed during operation.

11. The method of claim 9 further comprising:
   dynamically altering the state values to create dynamic ownership associations between a peripheral and the plurality of processors.

12. The method of clam 11 further comprising:
   providing a request register for each processor;
   providing a release register;
   in response to receiving a request for access to a specified peripheral from a first processor, generating an indication in the request register that the first processor has a pending access request;
   determining from the state value whether any processor other than the first processor is the current owner of the specified peripheral;
   when a second processor owns the peripheral, holding the request in a pending state;
   generating an indication in the release register in indicating that the second processor is releasing ownership of the peripheral; and
   in response to the indication in the release register, clearing both the request indication and the release indication and changing the state value to indicate that the first processor is the current owner of the specified peripheral.

13. The method of claim 12 wherein the step of providing a request register comprises implementing a data structure for each processor, where each data structure comprises a plurality of entries and each of the entries is associated with a specific one of the plurality of peripheral units.

14. The method of claim 13 wherein the step of providing a release register comprises implementing a data structure for each processor, where each data structure comprises a plurality of entries and each of the entries is associated with a specific one of the plurality of peripheral units.

15. The method of claim 11 further comprising:

storing a priority indication associated with each peripheral unit wherein the priority indication indicates which of the plurality of processors wins ownership when more than one processor generates an access request for the associated peripheral unit at substantially the same time.

16. A computer program product embodied in a tangible media and configured to cause a computer to share peripheral units amongst a plurality of host processors, the computer program product comprising:

a first code segment receiving an externally generated access request from a first host processor of the plurality of host processors wherein the access requests specify a peripheral unit;

a second code segment responsive to the first code segment for storing a state value associated with each peripheral unit indicating which of the plurality of processors is a current owner of the associated peripheral; and a third code segment causing the processor to selectively couple each peripheral unit to receive only access requests generated by a particular processor indicated by the state value associated with that peripheral unit.

17. A multiprocessing computing system comprising:

a plurality of processors;

a plurality of peripheral units, each having a connection to a shared input/output bus;

a bi-directional multiplexor for selectably coupling each of the plurality of processors to the shared input/output bus in response to an owner signal;

wherein the bi-directional multiplexor comprises:

an address multiplexor coupled to address outputs of each of the plurality of processors wherein the address multiplexor selectively couples one of the processor address outputs to a MUX address output based on the state of the owner signal:

a data multiplexor coupled to data outputs of each of the plurality of processors, wherein the data multiplexor selectively couples one of the processor data outputs to a MUX data output based on the state of the owner signal; and a set of peripheral-share registers wherein a first member of the set includes an entry associated with each of the plurality of peripheral units that holds a state value indicating which of the plurality of processors currently owns the associated peripheral unit.

18. The system of claim 17 wherein the plurality of processors comprise embedded processor cores integrated on a single integrated circuit chip.

19. The system of claim 17 further comprising:

a peripheral control register associated with each of the peripheral units, wherein the peripheral control register is shared amongst the plurality of processors.

* * * * *